Feb. 27, 1962 E. E. HOOD ET AL 3,022,682
SEMI-AUTOMATIC TWO-SPEED HUB AND COASTER BRAKE
Filed July 29, 1960

WITNESS:
Esther M. Stockton

INVENTORS
Edwin Elliott Hood
Hollis K. Gleasman
BY
ATTORNEY

United States Patent Office 3,022,682
Patented Feb. 27, 1962

3,022,682
SEMI-AUTOMATIC TWO-SPEED HUB AND COASTER BRAKE
Edwin Elliott Hood and Hollis K. Gleasman, Elmira, N.Y., assignors to The Bendix Corporation, Elmira Heights, N.Y., a corporation of Delaware
Filed July 29, 1960, Ser. No. 46,231
15 Claims. (Cl. 74—750)

The present invention relates to a semi-automatic two-speed hub and coaster brake for velocipedes and the like, and particularly relates to that type in which the shift from one gear or speed to the other is brought about by a slight backward rotation of the driving member and more specifically relates to the indexing mechanisms thereof.

It is an object of the present invention to provide a semi-automatic two-speed hub and coaster brake which is simple and durable in construction, compact structurewise, reliable, efficient and positive in operation and inexpensive to manufacture.

It is another object of the present invention to provide simplified indexing and selector mechanisms.

It is still another object of the invention to provide a simplified method of obtaining indexing actuation.

It is a further object of the invention to provide an indexing mechanism which can be assembled quickly and in a facile manner to assure properly timed positive indexing.

It is a further object of the invention to provide indexing mechanisms which form ratchet teeth in a manner which eliminates costly machine tool equipment and expensive and cumbersome prior art methods.

It is still a further object of the invention to provide indexing mechanisms which use a knurled component to obtain indexing spring actuation.

It is still a further object of the invention to provide indexing components which eliminate double indexing of the indexing mechanism.

It is still a further object of the invention to provide an indexing mechanism which will take up the slightest amount of over-indexing and assure positive indexing operation.

The foregoing and other objects and advantages of the invention will appear more fully from consideration of the detailed description which follows in conjunction with the accompanying drawing wherein one embodiment of the invention is illustrated. It is to be expressly understood, however, that the drawing is for the purpose of illustration and description and is not to be construed as defining the limits of the invention.

The following description is taken in connection and conjunction with the accompanying drawing in which.

Figure 1:
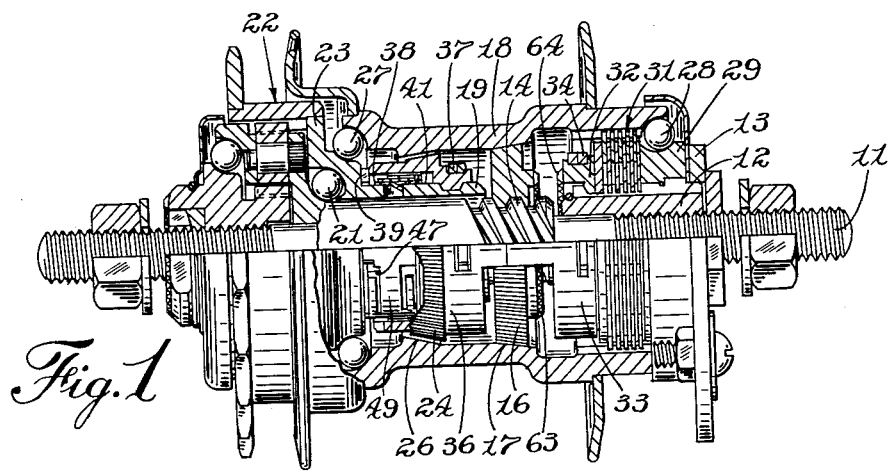
FIGURE 1 is a front elevation, partly broken away and in section, of a preferred embodiment of the invention illustrating the indexing mechanism operatively engaging the high speed clutch nut thereby allowing the low speed clutch nut to drivingly engage the hub.

In FIGURE 1 of the drawing there is illustrated a stationary axle 11 adapted to be mounted in the rear frame of a bicycle or the like. A brake anchor sleeve 12 is threaded on the axle and held from rotation by an arm 13 non-rotatably mounted and retained thereon by a clamping nut. The anchor arm is prevented from rotation by a clip adapted to be attached to the frame of the vehicle in any convenient manner.

The low speed screw shaft 14 is rotatably mounted on the axle and has a low speed clutch nut 16 threaded thereon adapted to be moved into and out of clutching engagement with a clutch surface 17 formed on the interior of the hub 18.

The high speed screw shaft 19 is rotatably mounted on the low speed screw shaft 14 by means of a bearing 21. A driving member generally indicated at 22 and incorporating reduction gearing and a sprocket is fixedly mounted on the high speed screw shaft by a ring member 23 rigidly connected to the driving member and mounted on the adjacent end of the high speed screw shaft by any suitable means such as brazing. A high speed clutch nut 24 is threaded on the high speed screw shaft 19 and adapted to be moved into and out of clutching engagement with a clutch surface 26 in the interior of the hub 18.

The driving member 22, through the reduction gearing, is also connected to an end of the low speed screw shaft 14 for rotating the low speed screw shaft at a different speed or gear than that of the high speed screw shaft 19.

The hub 18 is rotatably supported by means of bearings 27 and 28 journalled in races formed on the high speed screw shaft and in a bearing cone 29, respectively. The bearing cone 29 is fixedly mounted on or is an integral part of the brake anchor sleeve 12.

Brake discs, generally indicated at 31, are splined alternately to the hub 18 and the anchor sleeve 12 and are arranged to be pressed together against the bearing cone 29 by means of a brake pressure ring 32 also splined to the anchor sleeve 12. The brake pressure ring is retained on the anchor sleeve 12 by means of a lock ring.

Retarder means comprising a coupling member 33 journalled on the brake pressure ring 32 having a splined connection with the low speed clutch nut 16 and a wrap-down helical coil spring frictional retarder 34 journalled on the brake pressure ring provide the necessary retardation of the clutch nuts to cause them to be threaded upon their respective screw shafts. A second retarder means comprising a coupling member 36 journalled on the high speed clutch nut 24 having a splined connection with the low speed clutch nut 16 and a wrap-down coil spring frictional retarder 37 provide retardation of the high speed clutch nut 24 and any associated indexing and selector mechanisms. To this point invention has been adequately and clearly described and claimed in the Hood co-pending application, Serial No. 43,368 filed July 18, 1960, now U.S. Patent 2,982,384.

The indexing and selector mechanism which is associated with the high speed clutch nut 24 constitutes the invention of concern in this application and comprises a thimble member 38 which is fixedly secured on the high speed screw shaft 19. The end of the high speed screw shaft and the driving member's ring member 23 are formed to provide a radial shoulder 39. The contiguous extremity of the high speed screw shaft is also formed with a bearing portion 41. The thimble member 38 is fixedly secured to the bearing portion 41 by means of an instruck tab 42 engaging a hole 43 formed in the bearing portion. The hole in the screw shaft bearing portion is located relative to the threads of the screw shaft for properly locationing and anchoring of the thimble member 38.

The thimble member comprises a cylindrical body portion 44 with one extremity thereof being provided with notch means 46. This notched extremity abuts the shoulder means 39 of the high speed screw shaft 19 and thereby forms ratchet teeth 47 (FIGURE 1). The other extremity of the thimble body is provided with a radially outwardly extending flange 48. Swiveled on the thimble member cylindrical body 44 and axially limited by the flange 48 and shoulder 39 is an indexing member 49 which has a substantially cylindrical body portion 51. The extremity of this cylindrical body portion 51 of the indexing member overlying the ratchet teeth 47 is provided with a plurality of circumferentially spaced spring arms 52 serving as pawl members and engageable in the ratchet teeth. Also struck from the same extremity of the cylindrical body 51 are radial lug members 53 spatially disposed about the body portion 51. The opposite extremity of the cylindrical body 51 is provided with circumferentially spaced spring arms 54 which are radially biased outwardly and have their extremities 56 angularly biased or radially disposed to the body member of the spring arm. The disposition of the spring arms extremities 56 provides substantially triangular vertexes which results in maximum surface engagement existing between the extremities 56 and an axial knurl 61 of a hollow member 57 hereinafter described.

The high speed clutch nut 24 is provided with a hollow or tubular extremity 57 fixed secured thereto or integrally formed therewith and adapted to spatially encompass the thimble member 38 and the swiveled indexing member 49. The extremity of the hollow member is provided with circumferentially spaced notch means 58 which are disposed relative to the ratchet teeth 47 to provide proper indexing. The internal surface 59 of the hollow member 57 is axially knurled to a limited axial extent as at 61. The limited axial extent of the knurl will define a smooth portion 62 in the extremity of the hollow member adjacent the notched portions thereof.

Figure 2:
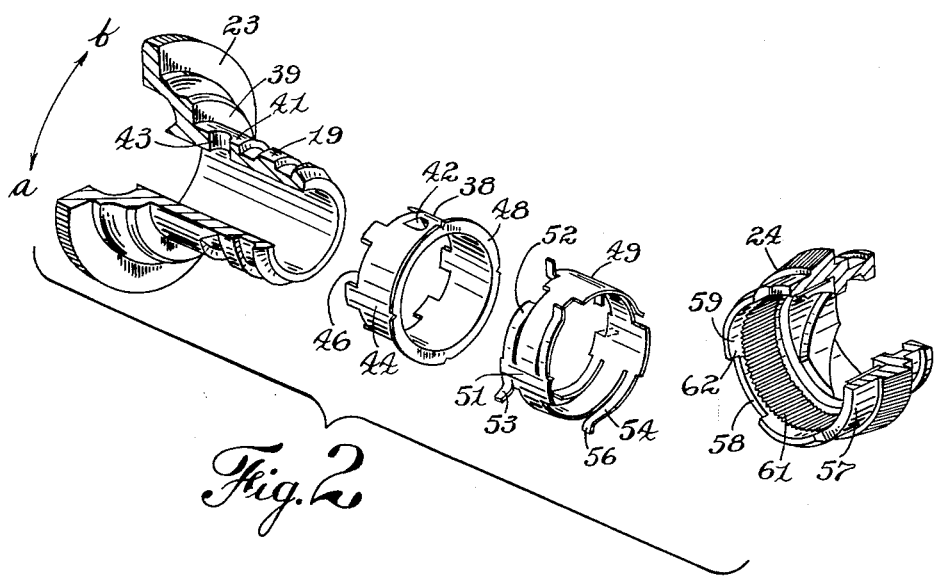
FIGURE 2 is an exploded perspective view of the high speed screw shaft, the thimble member, the indexing member and the high speed clutch nut with the screw shaft and clutch nut broken away and in section for added clarity.

In operation, starting with the parts in the position illustrated in FIGURE 1, forward rotation (which is clockwise when viewing the left-hand end of FIGURE 1 or in the direction indicated as *a* in FIGURE 2) of the driving member is transmitted to the screw shafts. Since the lug means 53 of the indexing member are illustrated as abutting the extremity of the hollow member 57 of the high speed clutch nut 24 rather than the notched portion 58 thereof, the high speed clutch nut will be effectively prevented from drivingly engaging the hub clutch surface 26. The low speed screw shaft 14 is concomitantly rotated by the driving member 22 and is threadedly traversed by the retarder means 33 and 34 into driving engagement with the hub clutch surface 17 and rotates the hub 18 at the lower speed or gear.

When it is desired to operate in the high gear, the operator back pedals slightly thus rotating the screw shafts backwardly. The high and low speed clutch nuts are prevented from rotating by their retarder connections to the axle, and thus they are threaded on their respective screw shafts away from the hub clutch surfaces 17 and 26. The backward rotation of the high speed screw shaft 24 in the direction indicated as *b* in FIGURE 2 will cause the thimble member 38 to be rotated therewith due to its being fixedly secured thereto. The indexing member 49, due to the engagement of its spring biased arm 54 and the knurled portion 61 of the hollow member 57, will be caused to be held stationary when the high speed screw shaft 19 is rotated backwards.

The hollow member 57 being fixed secured to the high speed clutch nut 24 is, of course, restrained from rotating as are the clutch nuts by the retarder means 33, 34, 36 and 37 which effectively couple the elements to the fixed axle 11. This rotational difference will cause the pawl members 52 of the indexing mechanism 49 to be rotarially displaced to the next or adjacent ratchet tooth. Because the axial knurled portion of the hollow member is of the limited extent, the engagement between the spring arm 54 and the knurl 61 will cease to exist after the high speed clutch nut has been threaded a predetermined distance along the high speed screw shaft. This limited engagement between the knurl 61 and arm 54 will prevent the pawl member 52 from being over-indexed to a second ratchet tooth. However, a slight degree of over-indexing may occur between the teeth 47 but this over-indexing will not be of sufficient magnitude to cause an indexing operation to take place which would thwart the operator's intent. It will be noted that the spring arms 54 are circumferentially directed in the same direction as the pawl arms 52. The circumferential direction is such that the spring arm extremities 56 will compressively abut the axial knurl 61 and provide a most positive driving connection during indexing or backward rotation of the high speed screw shaft. Upon subsequent forward rotation of the driving member 22, the high speed clutch nut 24 will be again threaded to the left in FIGURE 1 on the high speed screw shaft 19. Any over-indexing will then be automatically taken up due to the knurl 61 and spring arm 54 engagement and particularly because of the shape of extremity 56 thereof. The radial disposition of the extremity 56 is such as to provide a yieldably positive connection during the initial few degrees of forward rotation of the high speed screw shaft. This yieldable positive connection will prevent the indexing member from rotating with the high speed screw shaft until such time as the extremities of the pawls 52 definitely engage the side walls of the ratchet teeth 47 thereby effectively preventing any misalignment between the lugs 53 and notches 58 because of a slight over-indexing. Since the indexing member has been rotarially indexed one ratchet tooth, the lug members 53 will, of course, also be indexed one position relative to the high speed screw shaft. This indexing of the lug member will cause the lug member and the notch means 58 formed in the hollow member extremity of the high speed clutch nut to be in alignment or registry and will allow the high speed clutch nut to threadedly traverse the entire length of the thread of the high speed screw shaft to drivingly engage the hub clutch surface 26 and thus drive the hub at the higher speed or gear.

It should be readily apparent that the number of notch members 58 in the hollow member 57 should be in a ratio of one to two to the ratchet teeth 47 in order to provide the desired indexing of the lug member 53 and the notched teeth 58.

In the event the operator desires to operate the brakes he merely back pedals an amount to sufficiently cause the low speed clutch nut to be traversed on the low speed screw shaft in the backward direction and cause the dentil surface 63 of the low speed clutch nut to engage the dentil surface 64 of the brake pressure ring. The backward rotation of the low speed screw shaft 14 causes the low speed clutch nut to operate the brake pressure ring 32 to compress the brake discs 31, thus braking hub rotation. The dentils provided therebetween effectively prevent relative rotation between the brake pressure ring and the low speed clutch nut when engagement between these members occurs.

Although certain structures have been shown and described in detail, it will be understood that changes may be made in the design and arrangement of parts without departing from the spirit of the invention.

We claim:

1. A two-speed hub for bicycles including a plurality of screw shafts and complementing clutch nuts for drivingly engaging the hub, means for rotating the screw shafts in forward and backward directions at different speeds, indexing mechanisms for selectively blocking and allowing the driving engagement of one of said clutch nuts comprising a thimble member fixedly secured to one of the screw shafts and defining therewith ratchet teeth, a hollow member secured to said one clutch nut and movable therewith to spatially encompass portions of the thimble member, said hollow member having notch means formed thereon, an indexing member swiveled on the thimble member and adapted to interengage the hollow member and ratchet teeth, said indexing member comprising a pawl member biased into engagement with the ratchet teeth, a spring arm biased into engagement with the hollow member, and lug means adapted to be alternately brought into registry with the hollow member notch means upon backward rotation of said one screw shaft to thereby allow said one clutch nut upon subsequent forward rotation to entirely traverse said one screw shaft into driving engagement with the hub.

2. A device as set forth in claim 1 wherein the ratchet teeth and the hollow member notch means are formed in a ratio of two to one, respectively.

3. A device as set forth in claim 1 wherein the internal surface of said hollow member is axially knurled, said knurl extending a limited distance thereon and defining a smooth portion adjacent one extremity of the inner face of the hollow member, said knurled portion being engageable by said spring arm during a predetermined portion of said screw shaft backward rotation whereby the pawl member is caused to index one of said ratchet teeth and rotatively displace said lug means to one of its alternate positions.

4. In a two-speed hub for velocipedes and the like; a stationary axle; a hub rotatably mounted on the axle; a first screw shaft journalled on the axle; a first clutch nut threaded on said first screw shaft for drivingly engaging the hub; a second screw shaft rotatably mounted on said first screw shaft; a second clutch nut threaded on said second screw shaft for drivingly engaging the hub; means for rotating the screw shafts in forward and backward directions and at different speeds; means under the control of an operator for selectively blocking and allowing the driving engagement of said second clutch nut and said hub; said last named means comprising a thimble member fixedly secured to said second screw shaft and cooperating therewith to define ratchet means, a knurled member on said second clutch nut adapted to spatially encompass portions of the thimble member and having circumferentially spaced notch means, an indexing member swiveled on the thimble member, said indexing member being adapted to interengage the thimble member and knurl member and comprising a pawl member biased into engagement with the ratchet means, a spring arm biased into engagement with the knurl member, and lug means adapted to be alternately brought into registry with the knurl member notch means upon backward rotation of said second screw shaft to thereby allow said second clutch nut upon subsequent forward rotation of said second screw shaft to traverse said second screw shaft into driving engagement with the hub.

5. A device as set forth in claim 4 in which said second screw shaft includes a shoulder means and a bearing portion contiguous with its driven end, said bearing portion having anchor means formed thereon located relative to the threads of said second screw shaft.

6. A device as set forth in claim 5 in which the thimble means comprises a cylindrical body member supported on the shaft bearing portion, said thimble cylindrical body portion formed with spaced circumferential notch means in one extremity and adapted to abut the shaft shoulder means to thereby define the ratchet means, the other extremity of the thimble cylindrical body being formed with a flange adapted to limit axial movement of the swiveled indexing member, means formed in the thimble cylindrical body and adapted to cooperate with the shaft anchor means for securing the thimble member to said second screw shaft, said securing means being positioned relative to the ratchet means.

7. A device as set forth in claim 4 wherein the ratchet means and knurled member notch means are formed in a ratio of two to one, respectively.

8. A device as set forth in claim 4 in which the knurled member comprises an axially extending hollow portion, said circumferential notch means being formed in the free extremity thereof; the inner face of said hollow portion further characterized by the fact that the knurl extends a limited axial distance thereon and defines a smooth internal portion adjacent the notched extremity whereby the engagement between the knurled portion and said spring arm is limited to predetermined portions of axial movement of said second clutch nut.

9. A device as set forth in claim 8 in which the indexing member comprises a substantially cylindrical body member providing the swivel connection with the thimble member, said pawl member being integrally formed on one extremity thereof, said lug means being radially struck from said one extremity, said spring arm being integrally formed on the other extremity thereof and extending in the same circumferential direction as said pawl member, the extremity of said spring arm being radially outwardly offset to provide a knurl engaging surface substantially complementing the axial knurl whereby the maximum surface engagement between the knurl and the spring arm is caused to exist.

10. In a two-speed hub and coaster brake for velocipedes and the like: a fixed axle; an anchor member secured to the axle; a hub rotatably mounted relative to the axle; brake means interengaging the anchor means and the hub for braking hub rotation; a low speed screw shaft journalled on the axle; a low speed clutch nut threaded on the low speed screw shaft for drivingly engaging the hub and operatively engaging the brake means; a high speed screw shaft rotatably mounted on the low speed screw shaft; a high speed clutch nut threaded on the high speed screw shaft for drivingly engaging the hub; a driving member; gear means for rotating the screw shafts at different speeds from the driving member; a first retarder means frictionally and yieldably coupling the low speed clutch nut to the axle; a second retarder means frictionally and yieldably coupling the clutch nuts; and, indexing and selector means for selectively blocking and allowing the driving engagement of the high speed clutch nut, said last named means including a thimble member fixedly secured to the high speed screw shaft and cooperating therewith to define ratchet teeth, a knurled member on the high speed clutch nut having circumferentially spaced notch means, an indexing member swiveled on the thimble having a pawl member biased into engagement with the ratchet teeth and a spring arm biased for engagement with the knurled member, lug means on the indexing member adapted to be alternately brought into registry with the knurled member notch means upon backward rotation of the high speed screw shaft to thereby allow the high speed clutch nut upon subsequent forward rotation of the high speed screw shaft to traverse the high speed screw shaft into driving engagement with the hub.

11. A device as set forth in claim 10 in which the high speed screw shaft includes a radial shoulder and a bearing portion contiguous with its driven end, said bearing portion having anchor means located therein relative to the threads of the shaft; and, the thimble means comprises a cylindrical body member supported on the shaft bearing portion providing the swivel connection for the indexing member, said body member having circumferentially spaced notch means formed in one extremity and a radial flange formed in the other extremity thereof, the notched extremity being adapted to abut the shaft shoulder to thereby define the ratchet teeth and the flanged extremity being adapted to limit axial movement of the swiveled indexing member; securing means formed in the thimble means adapted to cooperate with the shaft anchor means for fixedly securing the thimble to the high speed screw shaft, said securing means being positioned relative to the thimble notch means whereby proper indexing operation is obtained.

12. A device as set forth in claim 10 wherein the ratchet teeth and the knurled member notch means are formed and arranged in a ratio of two to one, respectively.

13. A device as set forth in claim 10 in which the knurled member comprises an axially extending hollow member spatially encompassing portions of the thimble member, said circumferentially spaced notch means being formed in the free extremity thereof, said knurl being axially formed on the internal face of the hollow member; the hollow member being further characterized by the fact that the knurled portion extends a limited axial distance thereon and defines a smooth internal portion adjacent the notched extremity whereby engagement between the knurled portion and said spring arm is limited to predetermined portions of the axial movement of the high speed clutch nut.

14. A device as set forth in claim 10 in which the indexing member comprises a substantially cylindrical body member providing the swivel connection with the thimble member, said pawl means being integrally formed on one extremity thereof, said lug means being radially struck from said one extremity, said spring arm being integrally formed on the other extremity thereof, the extremity of said spring arm being radially outwardly offset to provide a knurl engaging surface substantially complementing the axial knurl whereby the maximum surface engagement between the knurl and the spring arm is caused to exist.

15. A device as set forth in claim 14 in which the indexing member spring arm is formed to extend circumferentially in the same direction as said pawl member whereby a positive driving connection is caused to exist between said indexing and knurled members during backward rotation of said high speed screw shaft and a yieldably positive connection is caused to exist between said members during the initial forward rotation of said shaft.

No references cited.